United States Patent
Neeli

(10) Patent No.: US 12,323,854 B2
(45) Date of Patent: Jun. 3, 2025

(54) INTELLIGENT WI-FI 6GHZ ACCESS POINT ASSOCIATIONS USING REDUCED NEIGHBOR REPORT ANNOUNCEMENTS

(71) Applicant: Fortinet, Inc., Sunnyvale, CA (US)

(72) Inventor: Srinivasa Subbarao Neeli, Bangalore (IN)

(73) Assignee: Fortinet, Inc., Sunnyvale, CA (US)

( * ) Notice: Subject to any disclaimer, the term of this patent is extended or adjusted under 35 U.S.C. 154(b) by 343 days.

(21) Appl. No.: 18/088,934

(22) Filed: Dec. 27, 2022

(65) Prior Publication Data

US 2024/0214870 A1 Jun. 27, 2024

(51) Int. Cl.
*H04W 28/08* (2023.01)
*H04W 28/086* (2023.01)
*H04W 84/12* (2009.01)

(52) U.S. Cl.
CPC ..... *H04W 28/086* (2023.05); *H04W 28/0942* (2020.05); *H04W 84/12* (2013.01)

(58) Field of Classification Search
CPC ........... H04W 28/0942; H04W 28/086; H04W 84/12; H04W 48/16; H04W 12/06; H04W 48/20; H04W 36/0072; G06N 20/00; H04L 43/0882; H04L 43/16; H04L 67/63; H04L 67/146; H04L 61/50; G06F 9/5077; G06F 11/3409; G06F 9/505
See application file for complete search history.

(56) References Cited

U.S. PATENT DOCUMENTS

| | | | | |
|---|---|---|---|---|
| 10,539,996 B2* | 1/2020 | HomChaudhuri | .... | G06F 12/123 |
| 11,829,800 B2* | 11/2023 | Casey | ..................... | H04L 47/83 |
| 12,118,404 B2* | 10/2024 | Casey | ................... | G06F 9/5077 |
| 2016/0112944 A1* | 4/2016 | Zhou | ..................... | H04W 48/16 |
| | | | | 370/338 |
| 2021/0132994 A1* | 5/2021 | Casey | ..................... | G06N 20/00 |
| 2022/0322094 A1* | 10/2022 | Maschue | ............ | H04W 12/106 |
| 2023/0247405 A1* | 8/2023 | Gilson | ................ | H04W 52/028 |
| | | | | 455/68 |
| 2024/0086252 A1* | 3/2024 | Casey | ................... | G06N 20/00 |

\* cited by examiner

*Primary Examiner* — Jung Liu
(74) *Attorney, Agent, or Firm* — Law Office of Dorian Cartwright; Dorian Cartwright

(57) ABSTRACT

Responsive to receiving a probe request at a first 6 GHz access point from a first 6 GHz station, while usage is above a threshold, a Wi-Fi controller with an AI neuron finds a best serving 6 GHz access point, from the plurality of 6 GHz access points, for the first 6 GHz station to be a second 6 GHz station, based in part on resource usage. A modified reduced neighbor report (RNR) is constructed for the first 6 GHz access point including adjusting a standard RNR report to steer the first 6 GHz station to the second 6 GHz access point with lower real-time resource usage than the first 6 GHz.

12 Claims, 7 Drawing Sheets

INTELLIGENT WI-FI 6GHZ ACCESS POINT ASSOCIATIONS USING REDUCED NEIGHBOR REPORT ANNOUNCEMENTS

FIELD OF THE INVENTION

The invention relates generally to computer security, and more specifically, to intelligently associating 6 GHz stations to best serving 6 GHz access points.

BACKGROUND

WLAN (Wireless Local Area Network) devices are eligible to operate in two unlicensed RF bands, 2.4 GHz RF band and the other is 5 GHz RF band. The 2.4 GHz RF band ranges from 2401 MHz through 2495 MHz, with a total 14 different channels will be available for the WLAN devices to operate (channels 1 through 14).

Similarly, 5 GHZ RF Band allows WLAN devices to select and operate over huge list of channels which ranges from 5170 MHz through 5330 MHz and 5490 MHz through 5815 MHz. This entire Frequency range is notated as UNII-I (channels 36 through 48), UNII-2 (channels 52 through 64), UNII-2 Extended (Channels 100 through 144) and UNII-3 (Channels 149 through 161). Altogether, over 5 GHz band, WLAN devices have 24 different channels to operate.

Due to the co-existence with other devices like Microwave ovens and Bluetooth devices, 2.4 GHz band has its own challenges like Interference etc. As the usage of WLAN network is growing day by day in different sectors, more 5 GHz capable devices are getting emerged in the market as 5 GHz RF band provides more channels to operate. As the count of 5 GHz capable devices are getting increased drastically, even 5 GHz spectrum is getting exhausted to support these huge count of WLAN operations. To overcome this issue, a new standard called Wi-Fi 6E was designed.

Problematically, Wi-Fi 6E access points keep stations on their own 6 GHz radio when moving from legacy radios, 2.4 GHz or 5 GHz. As a result, if an access point is performing poorly due to high resource usage, performance will decrease even further by taking on new stations.

What is needed is a robust technique for intelligently associating 6 GHz station to best serving 6 GHZ access points.

SUMMARY

To meet the above-described needs, methods, computer program products, and systems for intelligent 6 GHz station associations to best serving 6 GHz access points.

In one embodiment, resource usage of a plurality of 6 GHz access points is monitored. Radio frequency (RF) scanning capabilities and physical layer (PHY) capabilities of the plurality of 6 GHz access points can be learned using artificial intelligence (AI) or machine learning to analyze behavior.

In another embodiment, a probe request is detected from a first 6 GHz station at 2.4 GHz or 5 GHz. In response, RF scanning capability and PHY capability of the first 6 GHz station is learned. Also, it is determined whether resource usage at the first 6 GHz access point is above a threshold. Responsive to receiving a probe request at a first 6 GHz access point from a first 6 GHz station, while usage is above the threshold, a Wi-Fi controller with an AI neuron finds a best serving 6 GHz access point, from the plurality of 6 GHz access points, for the first 6 GHz station to be a second 6 GHz station, based in part on resource usage.

In still another embodiment, a modified reduced neighbor report (RNR) is constructed for the first 6 GHz access point including adjusting a standard RNR report to steer the first 6 GHz station to the second 6 GHz access point with lower real-time resource usage than the first 6 GHz. Information associated with the RNR report (i.e., entire modified RNR report, partial, or raw data) sent from the first 6 GHz access point, in response to the probe request, is transmitted to the first 6 GHz access point.

Advantageously, network performance and computer performance are improved with more responsive access points.

BRIEF DESCRIPTION OF THE DRAWINGS

In the following drawings, like reference numbers are used to refer to like elements. Although the following figures depict various examples of the invention, the invention is not limited to the examples depicted in the figures.

DETAILED DESCRIPTION

Methods, computer program products, and systems for intelligent 6 GHz station associations to best serving 6 GHz access points. One of ordinary skill in the art will recognize many alternative embodiments that are not explicitly listed based on the following disclosure.

I. Systems for Intelligent 6 GHz Access Point Steering (FIGS. 1-2)

Figure 1A:
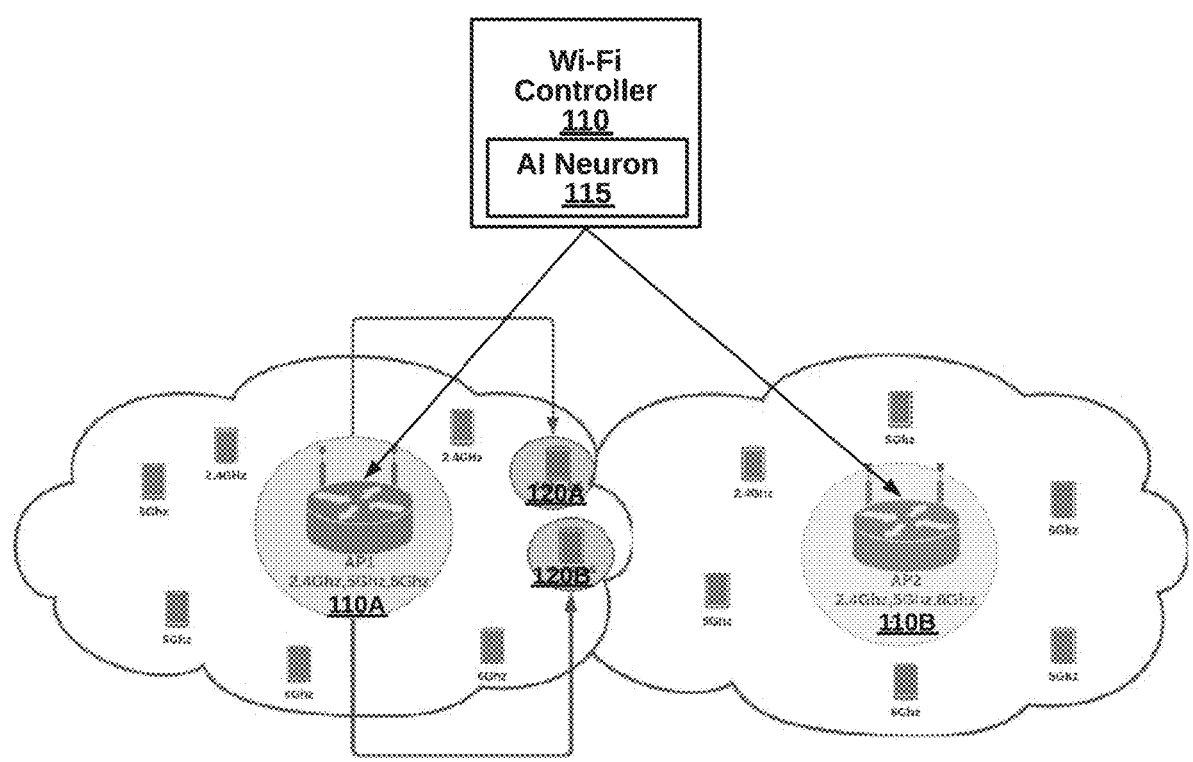
FIG. 1A is a high-level block diagram illustrating a system for intelligent 6 GHz station associations to best serving 6 GHz access points, prior to steering, according to one embodiment.

FIG. 1A is a high-level block diagram illustrating a system 100 for intelligent 6 GHz access point steering, prior to intelligent steering, according to one embodiment. The system 100 includes a Wi-Fi controller 110, access points 120 and stations 130. Other embodiments of the system 100 can include additional components that are not shown in FIG. 1.

In one embodiment, the components of the automatic system 100 are coupled in communication over a private network connected to a public network, such as the Internet. In another embodiment, system 100 is an isolated, private network. The components can be connected to the data communication system via hard wire (e.g., Wi-Fi controller 110, access points 120A, B). The components can also be connected via wireless networking (e.g., stations 120A, B). The data communication network 199 can be composed of any data communication network such as an SDWAN, an SDN (Software Defined Network), WAN, a LAN, WLAN, a cellular network (e.g., 3G, 4G, 5G or 6G), or a hybrid of different types of networks. Various data protocols can dictate format for the data packets. For example, Wi-Fi data packets can be formatted according to IEEE 802.11, IEEE 802.11r, and the like. Components can use IPV4 or IPV6 address spaces.

The Wi-fi controller 110 further comprises an AI-neuron 115, implemented as an OS patch or an application. The AI-neuron 115 intelligently monitors a WLAN network to predict future behavior. RF scanning capabilities and PHY capabilities of access points and stations are identified directly or indirectly from network traffic. When 6 GHz stations associate via a legacy 2.4 GHz or 5 GHz, an RNR is modified and sent to the 6 GHz stations to best serving 6 GHz access points regardless of a presently associated access point.

In other operations, Wi-fi controller 110 manages the 6 GHz access points and other devices, from a higher layer of the network hierarchy. Thus, Wi-fi controller 110 is able to keep uniformity among access points. For example, when stations roam from one access point to another, the same policies can be applied to stations across access points.

A threshold can be set for access points, that once surpassed, enables 6 GHz access point steering. One factor for the threshold is resource usage, such as processor, memory, or network interface loads. Many implementation-specific variations of the threshold are possible.

Figure 1B:
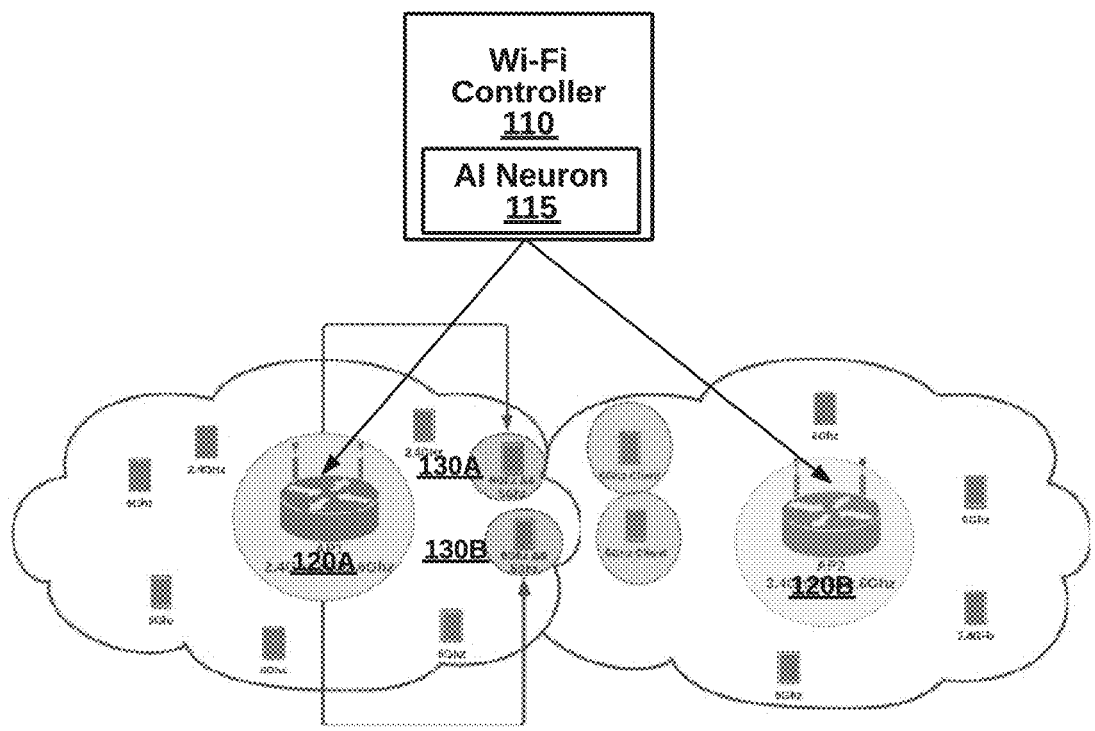
FIG. 1B is a high-level block diagram illustrating a system for intelligent 6 GHz station associations to best serving 6 GHz access points, subsequent to steering, according to one embodiment.
Figure 2:
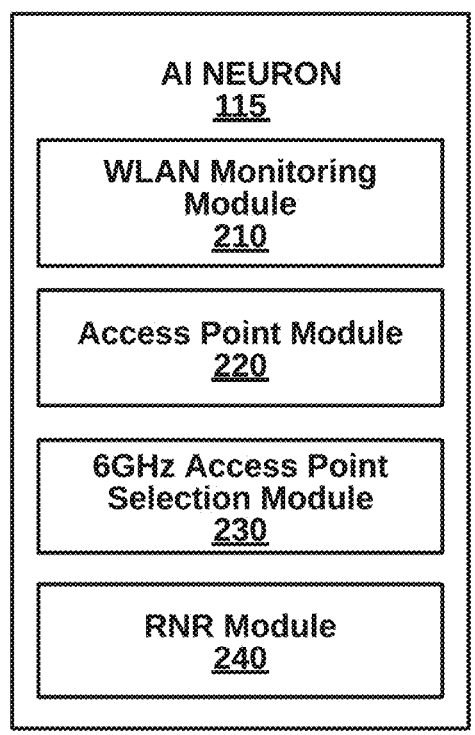
FIG. 2 is a more detailed block diagram illustrating an AI neuron of the system of FIG. 1, according to one embodiment.

FIG. 1B shows the system 100 after intelligent steering. The stations 130C, D are now associated with access point 120B, although a standard RNR or RSSI protocol would leave the stations 130C, D associated with access point 100A.

The 6 GHz access points 120 provide Wi-fi 6 GHZ capabilities to stations wirelessly accessing the private network. In one embodiment, each has at least one type of legacy radio operating at 2.4 GHz and/or 5 GHz along with at least one radio operating at 6 GHz. Different stations can simultaneously be connected to different radios, depending on station capabilities and radio availability. The 6 GHz access points 120A, B can be SU-MIMO or MU-MIMO, and implement security policies and network access policies.

The stations 130 have varying 6 GHz capabilities for wirelessly connecting to the private network through the access points 120. The stations initially connect via legacy 2.4 GHz or 5 GHz mediums using beacons and use an RNR element for upgrading to 6 GHz mediums. The stations can roam from 6 GHz service from one access point to another.

FIG. 2 is a more detailed block diagram illustrating the AI neuron 110 of the system of FIG. 1, according to one embodiment. The AI neuron 110 includes a monitoring module 210, an access point module 220, a 6 GHz access point selection module 230, and an RNR module 240. The components can be implemented in hardware, software, or a combination of both.

A monitoring module 210 to monitor resource usage of a plurality of 6 GHz access points. Radio frequency (RF) scanning capabilities and physical layer (PHY) capabilities of the plurality of 6 GHz access points are learned. The monitoring module 210 determines whether resource usage at the first 6 GHZ access point is above a threshold.

An access point module 220 can detect a probe request from a first 6 GHz station at 2.4 GHz or 5 GHz and learning RF scanning capability and PHY capability of the first 6 GHz station.

A 6 GHz access point selection module 230, responsive to receiving a probe request at a first 6 GHz access point from a first 6 GHz station, while usage is above the threshold, finds a best serving 6 GHz access point from the plurality of 6 GHz access points for the first 6 GHz station to be a second 6 GHz station based in part on resource usage.

An RNR module 240 can construct a modified reduced RNR for the first 6 GHz access point including adjusting a standard RNR report to steer the first 6 GHz station to the second 6 GHz access point with lower real-time resource usage than the first 6 GHZ.

A network interface 250 transmits, to the first 6 GHz access point, information associated with the RNR report sent from the first 6 GHz access point, in response to the probe request.

II. Methods for Intelligent 6 GHz Access Point Steering (FIGS. 3-5)

Figure 3:
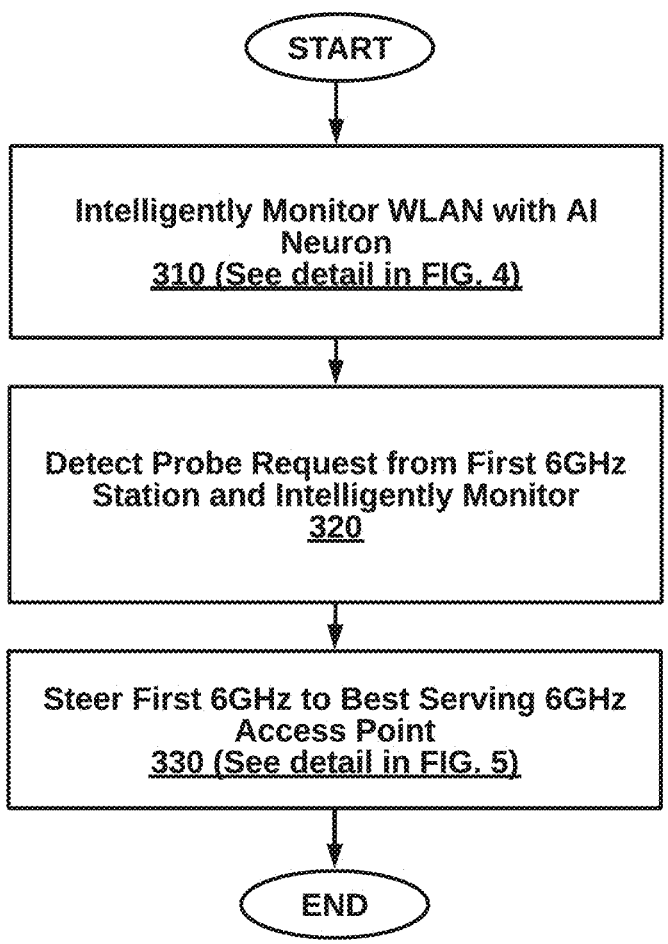
FIG. 3 is a high-level flow diagram illustrating a method for intelligent 6 GHz station associations to best serving 6 GHz access points, according to one embodiment.

FIG. 3 is a high-level flow diagram illustrating a method 300 for intelligent 6 GHz station associations to best serving 6 GHz access points, according to one embodiment. The method 300 can be implemented by, for example, system 100 of FIG. 1.

Figure 4:
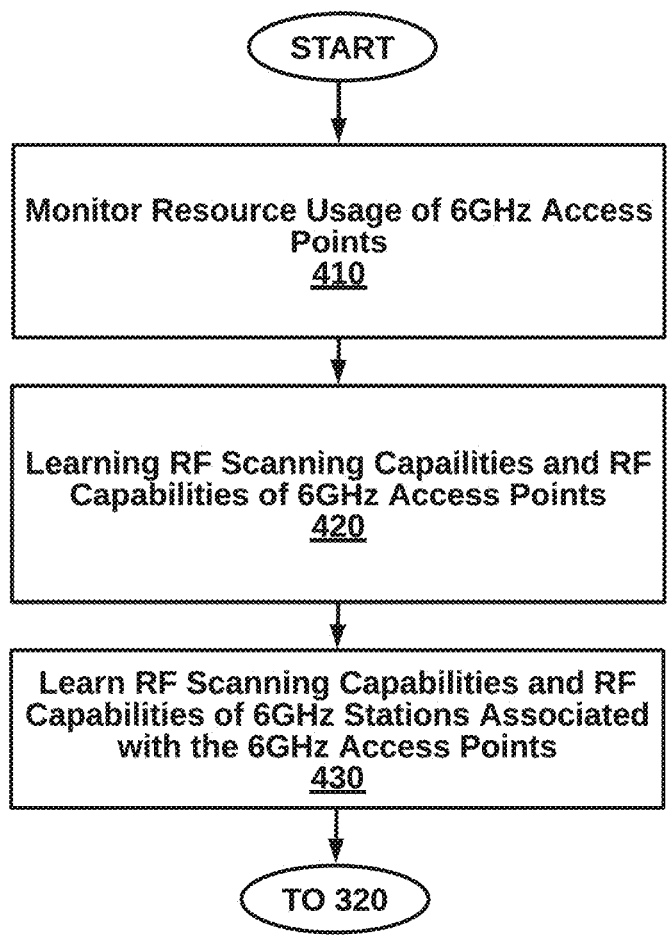
FIG. 4 is a more detailed flow diagram illustrating a step for intelligent monitoring of a WLAN, from the method of FIG. 3, according to an embodiment.
Figure 5:
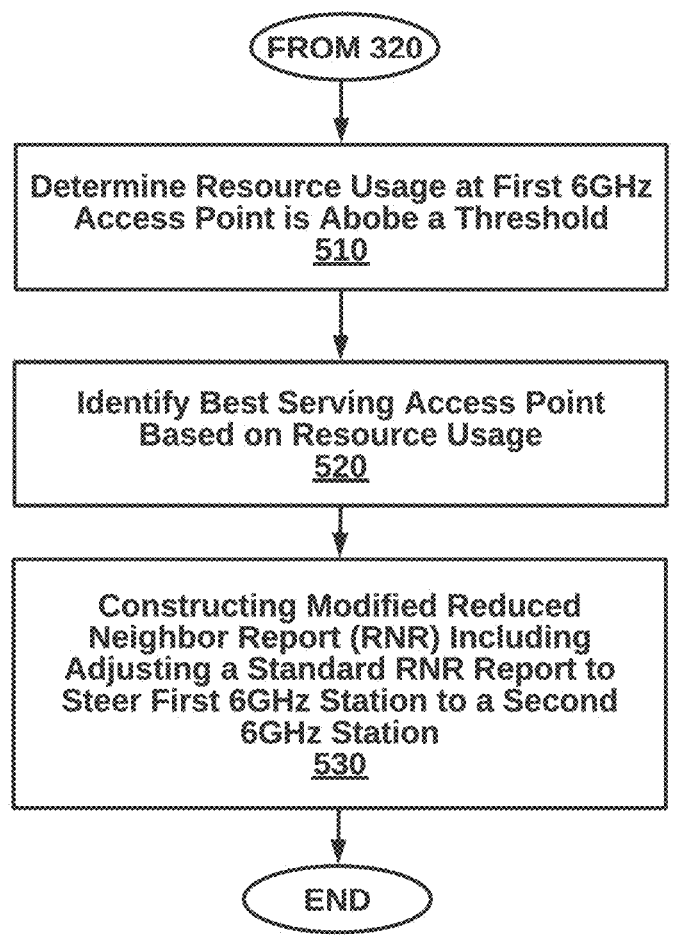
FIG. 5 is a more detailed flow diagram illustrating a step for steering 6 GHz access point associations, from the method of FIG. 3, according to an embodiment.

At step 310 intelligently monitoring a WLAN with an AI neuron, as shown in FIG. 4. At step 410, monitoring resource usage of a plurality of 6 GHz access points. At step 420, learning radio frequency (RF) scanning capabilities and physical layer (PHY) capabilities of the plurality of 6 GHz access points. At step 430, RF scanning capability and PHY capability of a first 6 GHz station associated with the first 6 GHz access point is learned.

Returning to FIG. 4, at step 320, a probe request is detected from a first 6 GHz station at 2.4 GHz or 5 GHz.

At step 330, the first 6 GHZ station is steered to a best serving 6 GHZ access point, rather than changing radios at the same access point, as described in more detail below in association with FIG. 5.

FIG. 5 is a more detailed flow diagram illustrating the step 330 of steering 6 GHz access point associations, from the method 300 of FIG. 3, according to an embodiment.

At step 510, it is determined that resource usage at the first 6 GHz access point is above a threshold.

At step 520, responsive to receiving a probe request at a first 6 GHz access point from a first 6 GHz station, while usage is above the threshold, finding a best serving 6 GHz access point from the plurality of 6 GHz access points for the first 6 GHz station to be a second 6 GHz station based in part on resource usage.

At step 530, constructing a modified reduced neighbor report (RNR) for the first 6 GHz access point including adjusting a standard RNR report to steer the first 6 GHz station to the second 6 GHz access point with lower real-time resource usage than the first 6 GHz.

At step 540 information associated with the RNR report sent from the first 6 GHz access point, in response to the probe request, is transmitted to the first 6 GHz access point.

III. Computing Device for Intelligent 6 GHz Access Point Steering (FIG. 6)

Figure 6:
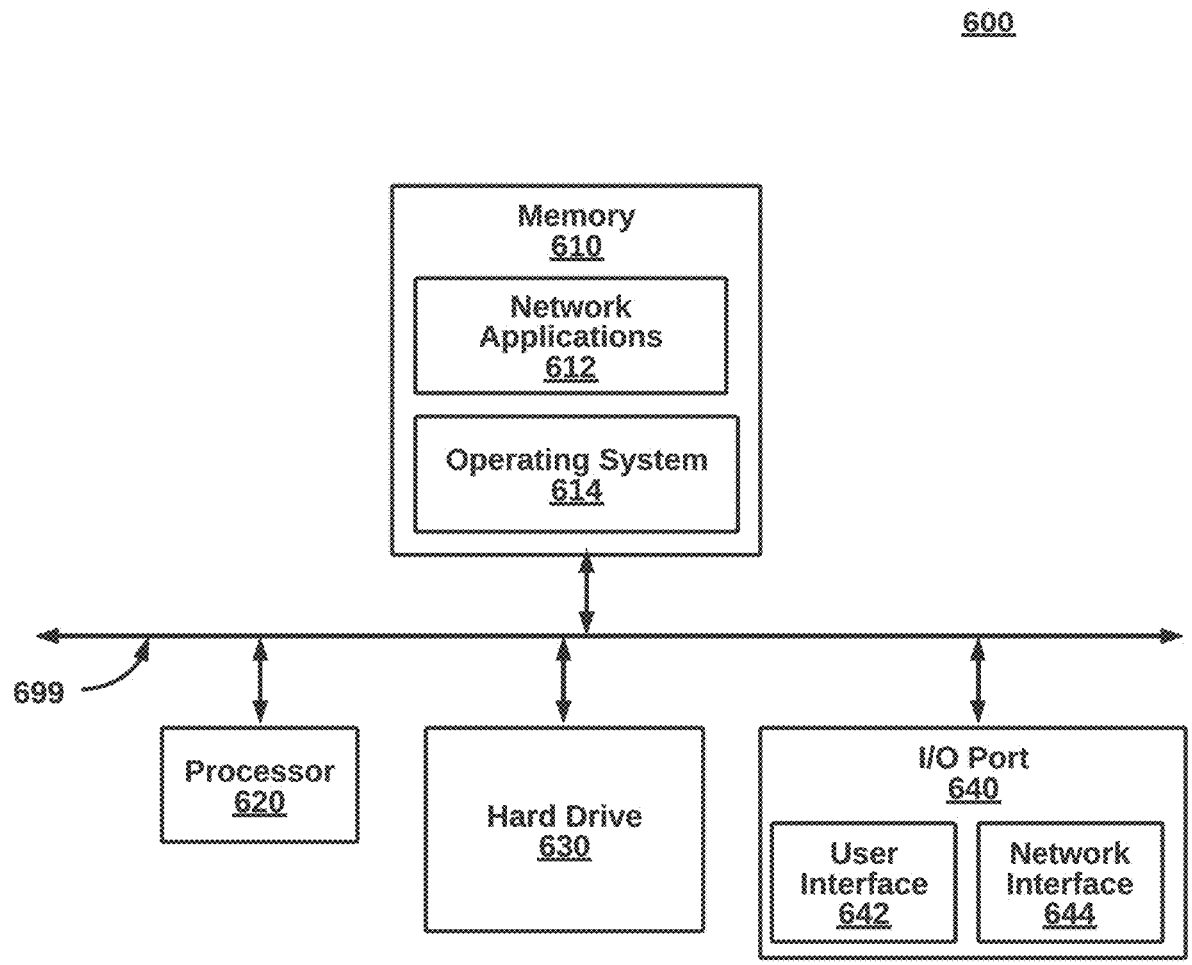
FIG. 6 is a block diagram illustrating an example computing device for the system of FIG. 1, according to one embodiment.

FIG. 6 is a block diagram illustrating a computing device 600 for use in the system 100 of FIG. 1, according to one embodiment. The computing device 600 is a non-limiting example device for implementing each of the components of the system 100, including Wi-fi controller 110, access points 120A, B, and stations 120A, B. Additionally, the computing device 600 is merely an example implementation itself, since the system 100 can also be fully or partially implemented with laptop computers, tablet computers, smart cell phones, Internet access applications, and the like.

The computing device 600, of the present embodiment, includes a memory 610, a processor 620, a hard drive 630, and an I/O port 640. Each of the components is coupled for electronic communication via a bus 650. Communication can be digital and/or analog, and use any suitable protocol.

The memory 610 further comprises network access applications 612 and an operating system 614. Network access applications can include 612 a web browser, a mobile access applications, an access applications that uses networking, a remote access applications executing locally, a network protocol access applications, a network management access applications, a network routing access applications, or the like.

The operating system 614 can be one of the Microsoft Windows® family of operating systems (e.g., Windows 98, 98, Me, Windows NT, Windows 2000, Windows XP, Windows XP x84 Edition, Windows Vista, Windows CE, Windows Mobile, Windows 7 or Windows 8), Linux, HP-UX, UNIX, Sun OS, Solaris, Mac OS X, Alpha OS, AIX, IRIX32, or IRIX84. Other operating systems may be used. Microsoft Windows is a trademark of Microsoft Corporation.

The processor 620 can be a network processor (e.g., optimized for IEEE 802.11), a general purpose processor, an access applications—specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 620 can be single core, multiple core, or include more than one processing elements. The processor 620 can be disposed on silicon or any other suitable material. The processor 620 can receive and execute instructions and data stored in the memory 610 or the hard drive 630.

The storage device 630 can be any non-volatile type of storage such as a magnetic disc, EEPROM, Flash, or the like. The storage device 630 stores code and data for access applications.

The I/O port 640 further comprises a user interface 642 and a network interface 644. The user interface 642 can output to a display device and receive input from, for example, a keyboard. The network interface 644 connects to a medium such as Ethernet or Wi-Fi for data input and output. In one embodiment, the network interface 644 includes IEEE 802.11 antennae.

Many of the functionalities described herein can be implemented with computer software, computer hardware, or a combination.

Computer software products (e.g., non-transitory computer products storing source code) may be written in any of various suitable programming languages, such as C, C++, C #, Oracle® Java, Javascript, PHP, Python, Perl, Ruby, AJAX, and Adobe® Flash®. The computer software product may be an independent access point with data input and data display modules. Alternatively, the computer software products may be classes that are instantiated as distributed objects. The computer software products may also be component software such as Java Beans (from Sun Microsystems) or Enterprise Java Beans (EJB from Sun Microsystems).

Furthermore, the computer that is running the previously mentioned computer software may be connected to a network and may interface to other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

The phrase "network appliance" generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network appliance include, but is not limited to, layer 2/3 routing, content inspection, content filtering, firewall, traffic shaping, application control, Voice over Internet Protocol (VOIP) support, Virtual Private Networking (VPN), IP security (IPSec), Secure Sockets Layer (SSL), antivirus, intrusion detection, intrusion prevention, Web content filtering, spyware prevention and anti-spam. Examples of network appliances include, but are not limited to, network gateways and network security appliances (e.g., FORTIGATE family of network security appliances and FORTICARRIER family of consolidated security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), FORIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical access applications. This description will enable others skilled in the art to best utilize and practice the invention in various embodiments and with various modifications as are suited to a particular use. The scope of the invention is defined by the following claims.

I claim:

1. A method in a Wi-Fi controller on a wireless local access network (WLAN), at least partially implemented in hardware, for intelligent 6 GHz station associations to best serving 6 GHz access points, the method comprising:
monitoring resource usage of a plurality of 6 GHz access points;
learning radio frequency (RF) scanning capabilities and physical layer (PHY) capabilities of the plurality of 6 GHz access points;
detecting a probe request from a first 6 GHz station at 2.4 GHz or 5 GHz and learning RF scanning capability and PHY capability of the first 6 GHz station;
determining that resource usage at the first 6 GHz access point is above a threshold;
responsive to receiving a probe request at a first 6 GHz access point from a first 6 GHz station, while usage is above the threshold, finding a best serving 6 GHz access point from the plurality of 6 GHz access points for the first 6 GHz station to be a second 6 GHz station based in part on resource usage;
constructing a modified reduced neighbor report (RNR) for the first 6 GHz access point including adjusting a standard RNR report to steer the first 6 GHz station to the second 6 GHz access point with lower real-time resource usage than the first 6 GHz; and
transmitting, to the first 6 GHz access point, information associated with the RNR report sent from the first 6 GHz access point, in response to the probe request.

2. The method of claim 1, wherein the step of constructing the modified RNR comprises:
adjusting a value for a collocated field of the second 6 GHz access point data to indicate describing the first 6 GHz access point, and
adjusting a value of a blind service set identification (BSSID) field from the first access point to the second 6 GHz access point and adjusting a value for a collocated field of the first 6 GHz access point data to indicate describing other than the first 6 GHZ access point.

3. The method of claim 1, wherein the threshold is defined by one or more of processor usage, memory usage, and network throughput.

4. The method of claim 1, wherein while resource usage is not above the threshold, transmitting the RNR report without modification.

5. The method of claim 1, further comprising:
maintaining a table of able of RF and PHY capabilities of the plurality of 6 GHz access points that are currently online.

6. The method of claim 1, wherein the first 6 GHz station associates with the second access point responsive to the modified RNR report.

7. The method of claim 1, further comprising:
continuing to monitor resource usage for the plurality of access points;
steering the first station to a third 6 GHz access point, responsive to resource usage of the second 6 GHz access point surpassing a second threshold and the third 6 GHz access point being the best serving 6 GHz access point.

8. The method of claim 1, wherein the probe request for the RNR report was transmitted over a 2.4 GHz channel or a 5 GHz channel by the first 6 GHz station.

9. The method of claim 1, wherein the first station associates with the first access point to send the probe request.

10. The method of claim 1, further comprising:
learning behavior, with artificial intelligence (AI), of the data communication network from the monitoring information.

11. A non-transitory computer-readable medium in a Wi-Fi controller, at least partially implemented in hardware, storing instructions that, when executed by a processor, perform a computer-implemented method for intelligent 6 GHz station associations to best serving 6 GHz access points, the method comprising:
monitoring resource usage of a plurality of 6 GHz access points;
learning radio frequency (RF) scanning capabilities and physical layer (PHY) capabilities of the plurality of 6 GHz access points;
detecting a probe request from a first 6 GHz station at 2.4 GHz or 5 GHz and learning RF scanning capability and PHY capability of the first 6 GHz station;
determining that resource usage at the first 6 GHz access point is above a threshold;
responsive to receiving a probe request at a first 6 GHz access point from a first 6 GHz station, while usage is above the threshold, finding a best serving 6 GHz access point from the plurality of 6 GHz access points for the first 6 GHz station to be a second 6 GHz station based in part on resource usage;
constructing a modified reduced neighbor report (RNR) for the first 6 GHz access point including adjusting a standard RNR report to steer the first 6 GHz station to the second 6 GHz access point with lower real-time resource usage than the first 6 GHz; and
transmitting, to the first 6 GHz access point, information associated with the RNR report sent from the first 6 GHz access point, in response to the probe request.

12. A Wi-Fi controller, at least partially implemented in hardware, for intelligent 6 GHz station associations to best serving 6 GHz access points, the malicious detection system comprising:
a processor;
a network interface communicatively coupled to the processor and to the hybrid wireless network; and
a memory, communicatively coupled to the processor and storing:
an intelligent WLAN module to monitor resource usage of a plurality of 6 GHz access points, learn radio frequency (RF) scanning capabilities and physical layer (PHY) capabilities of the plurality of 6 GHz access points, and determine that resource usage at the first 6 GHz access point is above a threshold;
an access point module to detect a probe request from a first 6 GHz station at 2.4 GHz or 5 GHz and learning RF scanning capability and PHY capability of the first 6 GHz station;
a 6 GHz access point selection module, responsive to receiving a probe request at a first 6 GHz access point from a first 6 GHz station, to find a best serving 6 GHz access point from the plurality of 6 GHz access points for the first 6 GHz station to be a second 6 GHz station based in part on resource usage;

an reduced neighbor report (RNR) module to construct for the first 6 GHz access point including an adjustment to a standard RNR report to steer the first 6 GHz station to the second 6 GHz access point with lower real-time resource usage than the first 6 GHz; and transmitting, to the first 6 GHz access point, information associated with the RNR report sent from the first 6 GHz access point, in response to the probe request.

\* \* \* \* \*